(12) United States Patent
Aoyama et al.

(10) Patent No.: US 6,578,442 B2
(45) Date of Patent: Jun. 17, 2003

(54) GEAR SHIFTING CONTROL DEVICE FOR SYNCHROMESH TRANSMISSION

(75) Inventors: Yoshiyuki Aoyama, Nishio (JP); Mitsutoshi Kamiya, Kariya (JP); Takeshige Miyazaki, Anjo (JP); Ryuji Choshi, Aichi-ken (JP); Yoshihiro Ichikawa, Gifu-ken (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/922,775

(22) Filed: Aug. 7, 2001

(65) Prior Publication Data

US 2002/0020235 A1 Feb. 21, 2002

(30) Foreign Application Priority Data

Aug. 7, 2000 (JP) ......................................... 2000-238094

(51) Int. Cl.[7] ................................................. F16H 3/38
(52) U.S. Cl. .......................... 74/335; 74/336 R; 74/339
(58) Field of Search .............................. 74/335, 336 R, 74/339; 477/124, 79, 80; 192/53.34, 53.341

(56) References Cited

U.S. PATENT DOCUMENTS 5,706,197 A    1/1998  Stasik et al.
6,164,149 A *  12/2000 Ohmori et al. ............. 477/121
6,276,224 B1 * 8/2001 Ueda et al. .................... 74/335

FOREIGN PATENT DOCUMENTS

JP          2000-46176      2/2000

* cited by examiner

*Primary Examiner*—Rodney H. Bonck
*Assistant Examiner*—Dennis Abdelnour
(74) *Attorney, Agent, or Firm*—Burns, Doane, Swecker & Mathis, LLP

(57) ABSTRACT

A gear shifting control device for varying a gear ratio of a synchromesh transmission which controls an actuator to agree with an actual value of sleeve load in an axial direction with a required value with higher accuracy at a synchronizer of the transmission. A continuously varying driving signal with time is supplied to the actuator when necessary to change the actual value of the sleeve load to the required value different from the current value. A reaching time of the driving signal reaching the value corresponding to the required value to the actuator is determined based on an initial speed which is a speed of the sleeve at start of supplying the driving signal and a vibration cycle when the sleeve load is vibrated in response to the supply of a step signal to the actuator.

8 Claims, 17 Drawing Sheets

GEAR SHIFTING CONTROL DEVICE FOR SYNCHROMESH TRANSMISSION

This application is based on and claims priority under 35 U.S.C. §119 with respect to Japanese Application No. 2000-238094 filed on Aug. 7, 2000, the entire content of which is incorporated herein by reference.

FIELD OF THE INVENTION

This invention generally relates to a gear shifting control device. More particularly, the present invention pertains to a gear shifting control device for a synchromesh transmission and actuation thereof.

BACKGROUND OF THE INVENTION

As a type of transmission for transmitting rpm from a vehicle power source to the driving wheels, a synchromesh transmission is known. In the synchromesh transmission, sliding elements do not exist in the power transmitting system from the power source to the driving wheels. Accordingly, the synchromesh transmission has advantages in that the driving wheels sensitively respond to the accelerating operation of the driver to obtain a driving feeling with good response, and in that the fuel consumption is reduced to contribute to saving energy.

To obtain the aforementioned advantages and to simplify the shifting operation by the driver compared to conventional manual transmissions, Japanese Patent Laid-Open Publication No. 2000-46176 discloses a gear shifting control device for varying the shift ratio of a synchromesh transmission by an electrically controlled actuator.

The transmission used along with a gear shifting control device of this kind includes a synchronizer for selecting one of a plurality of gear mates wherein respective gear mates are always intermeshed and wherein the gear ratios are different from one another as effective gear mate (in order to obtain a predetermined gear ratio). The synchronizer includes a sleeve and a synchronizer ring. The sleeve is relatively movable in an axial direction and is non-rotatable relative to a shaft to which one gear of the gear mates is relatively rotatably equipped as an idling gear. The synchronizer ring is relatively rotatable to the idling gear and relatively movable in an axial direction.

When the foregoing synchronizer is under operation, the sleeve is moved in the axial direction to be contacted to the synchronizer ring. Thus, the idling gear and the sleeve are synchronized by pressing the synchronizer ring to a frictional surface which is rotatable with (relatively non-rotatable) the idling gear. The synchronizer balks the intermeshing of a first clutch unitary rotating with (i.e., relatively non-rotatable to) the sleeve with a second clutch unitary rotating with (i.e., relatively non-rotatable to) the idling gear.

The foregoing gear shifting control device further includes an actuator, a transmitting mechanism, and a controller. The actuator generates a load for moving the sleeve in the axial direction. The transmitting mechanism transmits the load generated by the actuator to the sleeve. The controller controls an actuator for varying the shift ratio of the transmission based on at least one of: an intention of the driver, the vehicle condition, and the condition of the transmission.

In the gear shifting control device of this kind, a load transmitting system for transmitting the load from the actuator to the sleeve via the transmitting mechanism may include an inertial element and a spring element.

In this case, it is necessary to change an actual (current) value of the sleeve load to a required value (target value) different from the actual value. When a step signal is supplied to the actuator, a transient state occurs in the sleeve load during the period from the start of supply of the step signal until the period that the actual value of the sleeve load reaches the required value. The load under this transient state is called a surge load.

The surge load sometimes exceeds the required value of the sleeve load. The excessive surge load generates unpleasant noise and physical shock to the driver at a shift change of the transmission. Such excessive surge load may cause damage to the synchronizer ring.

A need exists for a gear shifting control device which controls the actuator to more accurately adjust the actual value of the sleeve load to the required value.

SUMMARY OF INVENTION

In light of the foregoing, the present invention provides a gear shifting control device for synchromesh transmission transmitting a rotation of a power source to driving wheels which includes a gear mate always intermeshed and a synchronizer for selecting one of a plurality of gear mates having different gear ratios from one another as an effective gear mate. The synchronizer includes a shaft, with one gear of the gear mate being relatively rotatably equipped thereon as an idling gear, a sleeve relatively non-rotatable to the shaft and relatively movable in axial direction, a synchronizer ring relatively rotatable to the idling gear and relatively movable in an axial direction, a frictional surface relatively non-rotatable to the idling gear, a first clutch relatively non-rotatable to the sleeve, and a second clutch relatively non-rotatable to the idling gear. The sleeve is moved in an axial direction to contact the synchronizer ring. The idling gear and the sleeve are synchronized by pressing the synchronizer ring to the frictional surface. The first clutch and the second clutch are balked relative to one another until the synchronization between the sleeve and idling gear.

The gear shifting control device for a synchromesh transmission further includes an actuator for generating a load for moving the sleeve in the axial direction and electrically controlled in accordance with an external signal, a transmitting mechanism for transmitting the generated load by the actuator to the sleeve, and a controller for controlling the actuator for varying the gear ratio of the transmission based on at least one of a driver's intention, vehicle condition, and condition of the transmission, the controller supplying a driving signal continuously varying in accordance with time to the actuator when necessary to change an actual value of sleeve load operating the sleeve to a required value different from a current value.

BRIEF DESCRIPTION OF THE DRAWINGS

The foregoing and additional features and characteristics of the present invention will become more apparent from the following detailed description considered with reference to the accompanying drawing figures in which like reference numerals designate like elements and wherein.

DETAILED DESCRIPTION OF PREFERRED EMBODIMENTS OF THE INVENTION

Figure 1:
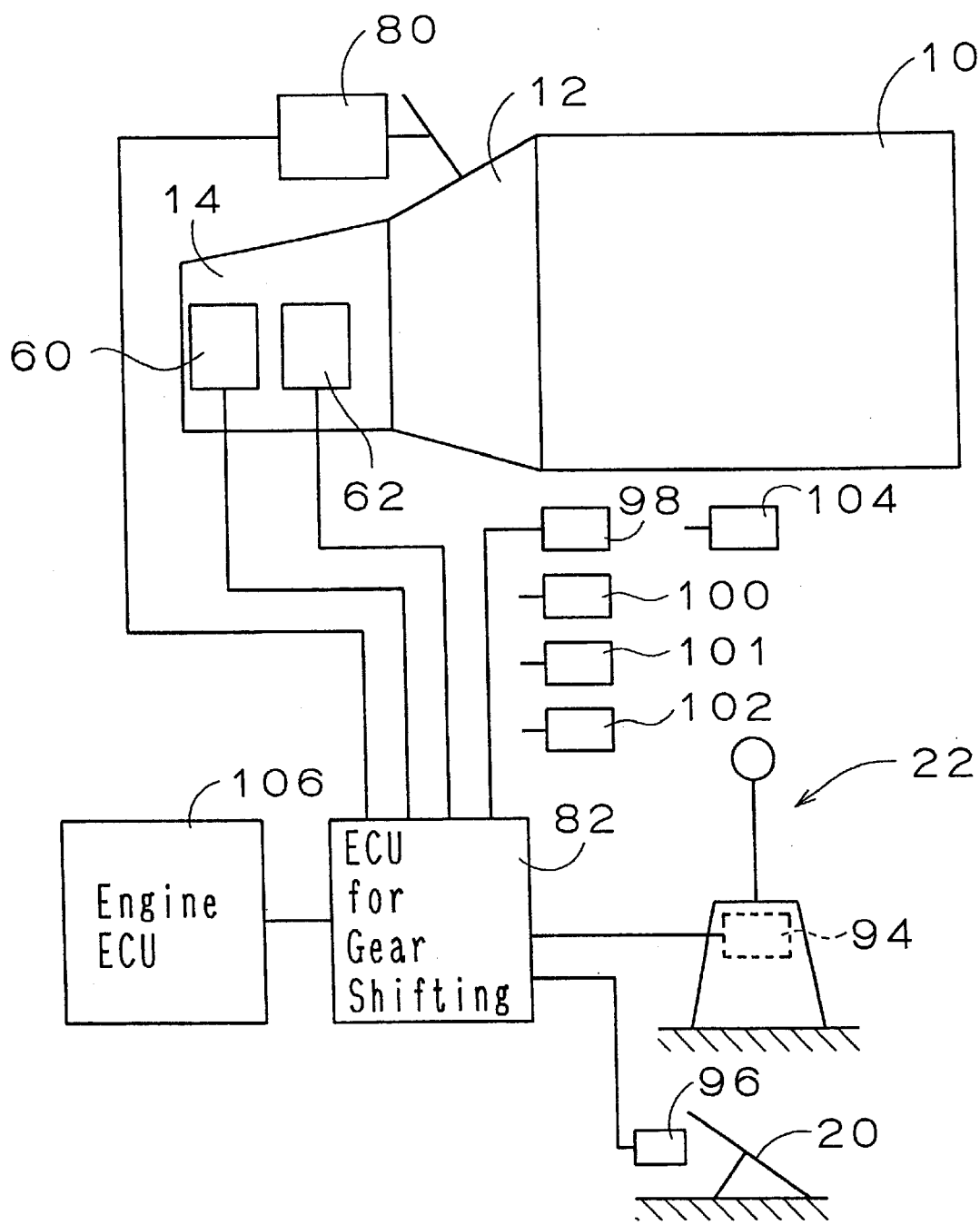
FIG. 1 is a schematic view showing hardware structure of gear shifting control device for a synchromesh transmission according to a first embodiment of the present invention.

Referring to the drawings, two embodiments of the present invention will be explained.

FIG. 1 shows a schematic view of a hardware structure of a gear shifting control device according to a first embodiment of the present invention. The gear shifting control device is disposed on a vehicle whose power source is an engine (internal combustion engine) 10. In this vehicle, an output shaft (not shown) of the engine 10 is connected to a plurality of driving wheels (not shown) via a clutch 12 and a synchromesh transmission 14.

The vehicle includes a throttle pedal 20 functioning as an acceleration controlling member by a driver. This vehicle further includes a shift lever 22 functioning as a shifting operation member for gear shifting the transmission 14 by the driver.

The shift lever 22 is designed to be operated in an H-shaped shifting pattern the same as with a completely manually operated transmission. Accordingly, the shifting operation of the shift lever 22 includes a shifting operation in the fore-aft direction of the vehicle and a select operation in the lateral direction of the vehicle. Structuring the shifting operation member as a shift lever 22 is not indispensable in the first embodiment of the present invention. For example, the shifting operation member could be structured as an incremental type switch equipped on a steering wheel operated by the driver.

As is widely known, the transmission 14 includes an input shaft (not shown) connected to the clutch 12, an output shaft 26 (shown in FIG. 2) coaxial to the input shaft, and a counter shaft (not shown) extended in parallel with the input shaft and the output shaft 26. The rotation is always transmitted via a pair of gear mates between the input shaft and the counter shaft. The rotation is transmitted by selecting one of a plurality of gear mates having different respective gear ratios as an effective gear mate between the output shaft 26 and the counter shaft. The selection is conducted by a plurality of synchronizers.

Figure 2:
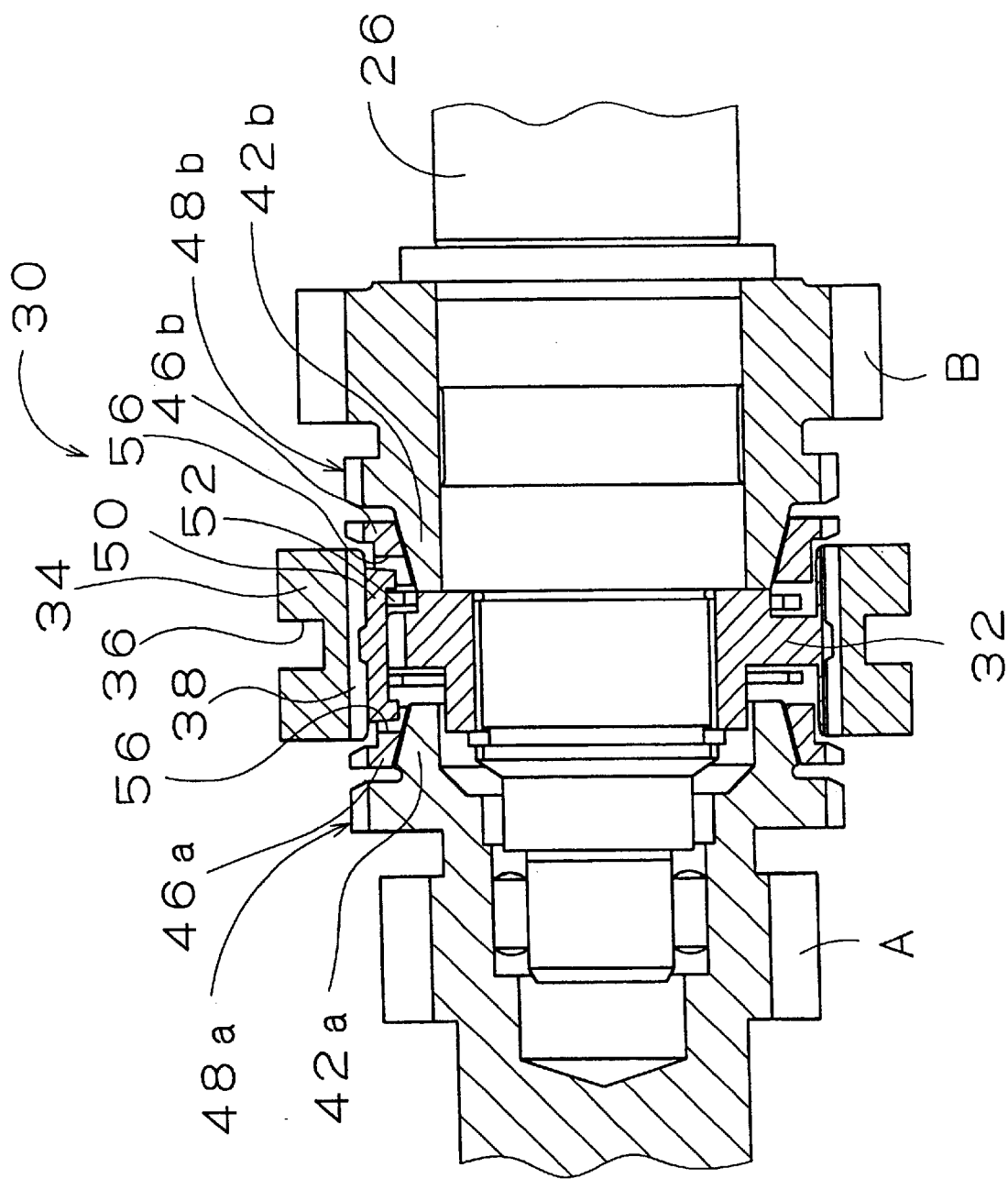
FIG. 2 is a front sectional view showing a synchronizer used in the gear shifting control device shown in FIG. 1.

FIG. 2 shows a synchronizer 30 which is a Borg Warner balking-type synchronizer.

The synchronizer 30 includes a clutch hub 32 mounted thereon for rotation therewith (always relatively non-rotatable). On the outer periphery of the clutch hub 32, a sleeve 34 is disposed, and the clutch hub 32 and the sleeve 34 are always rotatable together and movable together in the axial direction. On the outer periphery of the sleeve 34, an annular groove 36 is formed. A shift fork (not shown) is disposed in the groove 36 by holding the sleeve 34 from both sides. The sleeve 34 is moved in the axial direction along with the shift fork but is rotatable relatively to the shift fork. In the inner periphery of the sleeve 34, a plurality of circumferentially spaced clutch teeth 38 are formed to define a first clutch on the sleeve 34.

A gear A and a gear B are relatively rotatably mounted on the output shaft 26 respectively at two axially fixed positions having the sleeve 34 therebetween. The gear A and the gear B function as idling gears and are always intermeshed with respective gears (not shown) fixed to the counter shaft.

On the outer peripheral portion of a shaft portion of the gear A close to the sleeve 34, a cone 42a is formed having a conical surface whose diameter is gradually smaller approaching the sleeve 34. The conical surface of the cone 42a constitutes an example of the frictional surface of the present invention.

The cone 42a carries an axially slidable synchronizer ring 46a having a conical surface supplementing the conical surface of the cone 42a. On the outer periphery of the synchronizer ring 46a, a plurality of circumferentially spaced teeth are formed. The plurality of teeth are selectively intermeshed with the clutch teeth 38 of the sleeve 34.

On the peripheral portion of the shaft portion of the gear A close to the cone 42a, a plurality of teeth 48a are formed to define a second clutch on the gear A. The teeth clutch 48a are selectively intermeshed with the clutch teeth 38 of the sleeve 34.

Between the clutch hub 32 and the sleeve 34, a plurality of circumferentially spaced shifting keys 50 are equipped. Each shifting key 50 extends in the axial direction of the sleeve 34 with a predetermined width. Each shifting key 50 is always pressed against an inner peripheral surface of the sleeve 34 by a respective key spring 52 positioned between the shifting key 50 and the clutch hub 32. A protrusion or convexity formed on an outer face of each shifting key 50 is disposed in a recess formed on the inner surface of the sleeve 34. When the sleeve 34 is slidably moved in the axial direction and when the protrusion does not ride over a slope of the recess because the spring force pushing the key against the sleeve does not exceed a predetermined value, the sleeve 34 and the shifting key 50 move as one unit. On the other hand, when the protrusion rides over the slope because the aforementioned force exceeds the predetermined value, only the sleeve 34 is moved.

The plurality of shifting keys 50 are always partially inserted into respective concave portions 56 formed in the synchronizer ring 46a. The concave portions 56 extend in the axial direction of the synchronizer ring 46a and are configured so that relative rotation between the sleeve 34 and the synchronizer ring 46a is allowed in a predetermined range. The position of the bottom surface of the concave portion 56 is predetermined to have a clearance between the tip end surface of the corresponding shifting key 50 when the sleeve 34 and the synchronizer ring 46a are at an initial position. The clearance is reduced as the shifting key 50 is approaches the synchronizer ring 46a. When the clearance is eliminated, the force of the shifting key 50 in the axial direction is transmitted to the synchronizer ring 46a, and thus the synchronizer ring 46a is pushed up along the cone 42a. By the resulting pressure, the relative rotation between the sleeve 34 and the gear A is reduced.

When the sleeve 34 continues to be moved in the same axial direction after the shifting key 50 contacts the synchronizer ring 46a, only the sleeve 34 moves axially, and thus the tip end surface of the teeth 38 of the sleeve 34 contacts the tip end surface of the teeth of the synchronizer ring 46a. When the relative rotational speed between the sleeve 34 and the gear A is not substantially zero, the clearance in the axial direction between the shifting key 50 and the concave portion 56 is eliminated, and thus the rotation of the synchronizer ring 46a relative to the sleeve 34 is stopped. Accordingly, a further movement of the sleeve 34 in the direction of the synchronizer ring 46a is blocked by the synchronizer ring 46a. That is, the sleeve 34 is balked. Simultaneously, resulting from pressing the synchronizer ring 46a hard along the cone 42a by the sleeve 34, the relative rotational speed between the sleeve 34 and the gear A is reduced to substantially zero.

When that relative rotational speed is substantially zero, that is when the synchronization is completed, hardly any frictional force between the synchronizer 46a and the cone 42a is generated. Thus, the synchronizer ring 46a becomes relatively rotatable to the sleeve 34. Accordingly, the teeth of the sleeve 34 advance into the teeth of the synchronizer ring 46a in the axial direction and thus the teeth of the sleeve 34 and the synchronizer ring 46a are intermeshed. Soon afterward, the clutch teeth 38 of the sleeve 34 are advanced into the teeth clutch 48a of the gear A in the axial direction, and thus the clutch teeth 38 of the sleeve 34 are intermeshed with the clutch teeth 48a of the gear A.

Likewise as the gear A, the gear B is formed with a cone 42b and a clutch 46b. The cone 42b is equipped with a synchronizer ring 46b.

When the clutch teeth 38 of the sleeve 34 are intermeshed with the teeth of the synchronizer ring 46a of the gear A side and the clutch teeth 48a of the gear A, the rotation of the gear A is transmitted to the output shaft 26. Under this condition, a set of gear mates is defined by the gear A and another gear always intermeshed with the gear A and rotating along with the counter shaft. On the contrary,when the clutch teeth 38 of the sleeve 34 are intermeshed with the teeth of the synchronizer ring 46b (adjacent the gear B) side and with the clutch teeth 48b of the gear B, the rotation of the gear B is transmitted to the output shaft 26. Under this condition, another set of gear mates is defined by the gear B and another gear which is always intermeshed with the gear B and rotating along with the counter shaft. As described in the forgoing, the transmitted rotation to the output shaft 26 is selected from the gear A and the gear B in accordance with the movement of the sleeve 34. As a result, the shift ratio of the transmission 14 is varied.

In the gear shifting control device according to the first embodiment of the present invention, the change of the shift ratio of the transmission 14, (i.e., shift change) is automatically conducted. In this gear shifting control device, a plurality of shift forks are provided having respective shifting rods 68, the rods engaged with respective ones of the plurality of sleeves 34 of the plurality of synchronizers 30. The shift forks are operably connected to an actuator as will be explained.

As shown in FIG. 1, the actuator includes a shift actuator 60 and a select actuator 62. The shift actuator 60 is operated by a shifting operation of the shift lever 22. The select actuator 62 is operated with select operation. The shift actuator 60 and the select actuator 62 are actuated by an electric driving source or a pressure power source.

Figure 3:
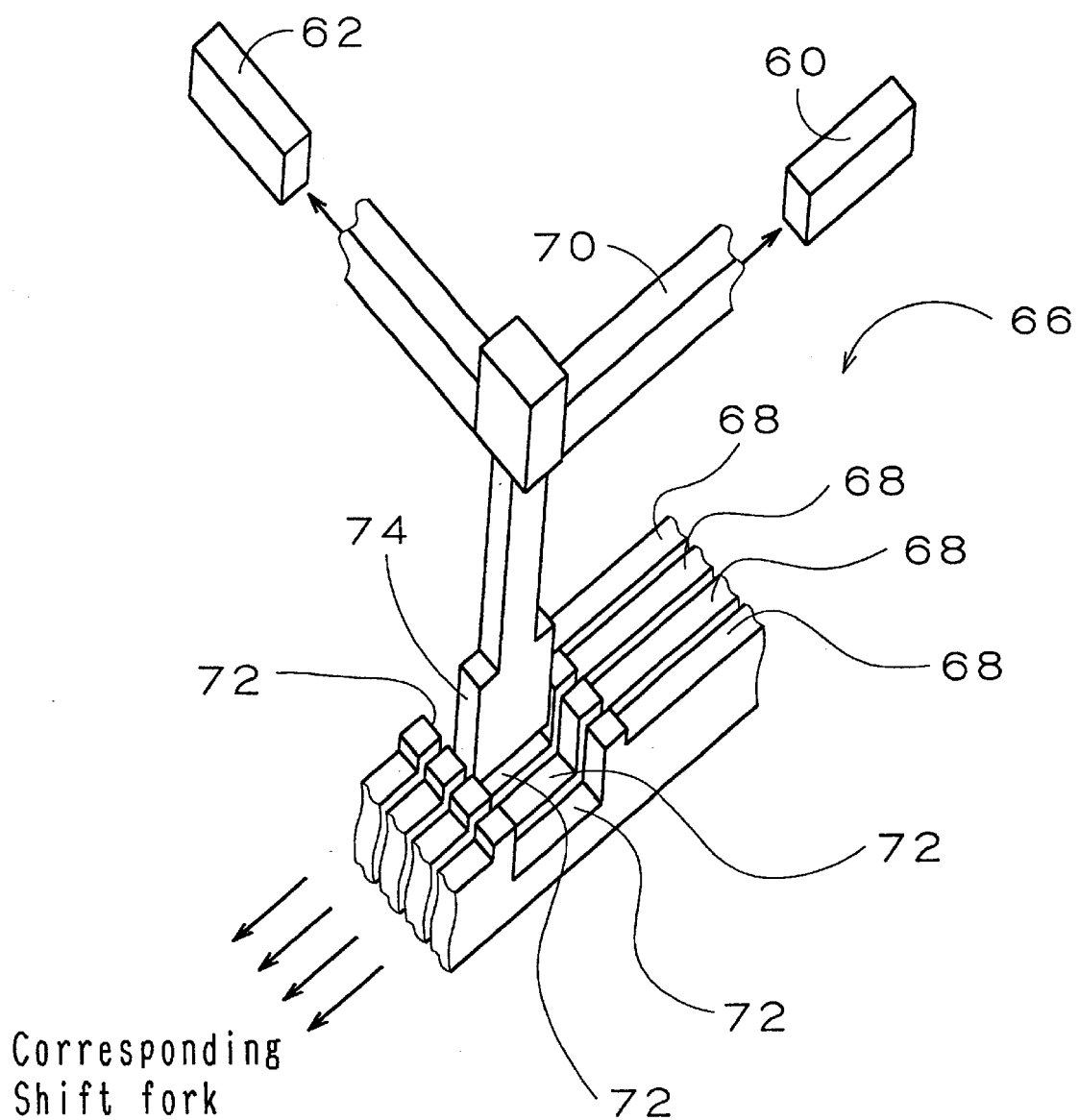
FIG. 3 is a perspective view showing a transmitting mechanism of the gear shifting control device shown in FIG. 1.

As shown in FIG. 3, a transmitting mechanism 66 includes the plurality of shifting rods 68 extending in parallel with the axial direction of the plurality of sleeves 34. The transmitting mechanism 66 further includes a transmitting rod 70 transmitting a generated load of the shift actuator 60 to one of the plurality of shifting rods 68. A plurality of connecting portions 72 preferably in the form of recesses are formed on the plurality of shifting rods 68. A connecting portion 74 of the transmitting rod 70 is connected to a selected connecting portion 72. The selection of one of the connecting portions 72 is conducted by relative movement between the connecting portion 74 of the transmitting rod 70 and the plurality of shifting rods 68, the relative movement effected by the select actuator 62.

The clutch 12 selectively connects and disconnects the output shaft of the engine 10 relative to the input shaft of the transmission 14. In the gear shifting control device, switching of the clutch 12 is automatically conducted. The automatic switching is conducted by a clutch actuator 80 shown in FIG. 1. The clutch actuator 80 is actuated by an electric driving source or a pressure power source, as is the shift actuator 60 and the select actuator 62.

Figure 4:
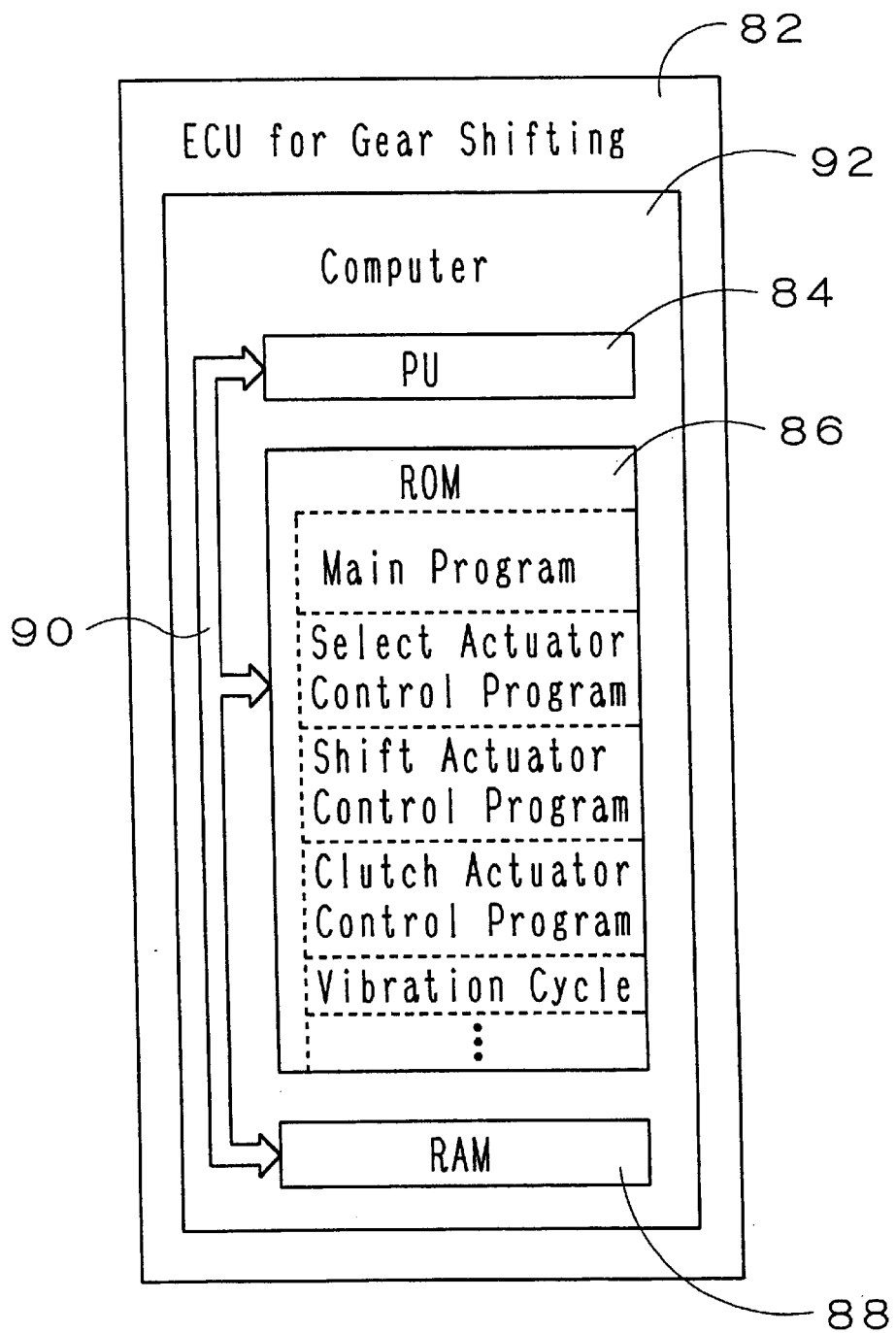
FIG. 4 is a schematic view showing a structure of ECU for gear shifting of FIG. 1.

The clutch actuator 80, the shift actuator 60, and the select actuator 62 are controlled by an ECU (Electronic Control Unit) for gear shifting 82 shown in FIG. 1. The ECU 82, as shown in FIG. 4, is structured with a computer 92 including a processing unit (herein after called PU) 84, a read-only memory (hereinafter called ROM) 86, and a random access memory (hereinafter called RAM) 88 mutually connected with a bus 90. The PU 84 may perform a plurality of programs memorized in the ROM 86 as one unit by one processor, or may perform the plurality of programs by a plurality of processors individually.

As shown in FIG. 1, a plurality of sensors for detecting the intentions of the vehicle driver are connected to an input portion of the ECU for gear shifting 82. The plurality of sensors includes a shift position sensor 94 for detecting the operational position of the shift lever 22 and a pedal position sensor 96 for detecting the operational position of the throttle pedal 20.

The input portion of the ECU for gear shifting 82 is further connected with a plurality of sensors for detecting the operational condition of the transmission 14. The plurality of sensors includes a position sensor 98, a first load sensor 100, a second load sensor 101, an input rotational sensor 102, and an output rotational sensor 104. The position sensor 98 detects the moving position of the transmitting rod 70. The first load sensor 100 detects the load operating the shifting rod 68 as a load equal to the sleeve load. The second load sensor 101 detects the load operating the transmitting rod 70 as a load equal to an input load from the shift actuator 60 to the transmitting rod 70. The input rotational sensor 102 detects the rotational number of the input shaft of the transmission 14. The output rotational sensor 104 detects the rotational number of the output shaft 26.

The shift actuator 60, the select actuator 62, and the clutch actuator 80 are connected to the output portion of the ECU for gear shifting 82. The ECU for gear shifting 82 controls the related value, such as instantaneous electric current, instantaneous electric voltage, internal electric current, and integral electric voltage, of the electric energy supplied to the shift actuator 60, the select actuator 62, and the clutch actuator 80 based on the signal form the aforementioned plurality of sensors.

The ECU for gear shifting 82 is connected to the shift actuator 60, the select actuator 62, and the clutch actuator 80 via a driver (not shown) connected to electric source (not shown) by a known method. By controlling the order signal to the driver, the ECU for gear shifting 82 controls the related value of the electric energy supplied to the shift actuator 60, the select actuator 62, and the clutch actuator 80 from the electric source via the driver. In the first embodiment, the explanation regarding the order signal to the driver will be omitted. According to the first embodiment, supplying the electric energy to the shift actuator 60, the select actuator 62, and the clutch actuator 80 in accordance with the order signal of the ECU for gear shifting 82 is expressed as outputting the drive signal to the shift actuator 60, the select actuator 62, and the clutch actuator 80 by the ECU for gear shifting 82.

The ECU for gear shifting 82 is operatively connected with other ECUs, for example an engine ECU 106 for controlling the engine 10, for controlling the same vehicle. The ECU for gear shifting 82 receives necessary signals from other ECUs and sends necessary signals to other ECUs.

In the ROM 86 of FIG. 4, programs shown as flowcharts in FIGS. 5–8, such as a main program, a select actuator control program, a shift actuator control program, and a clutch actuator control program, are memorized. Each program will be explained as follow.

Figure 5:
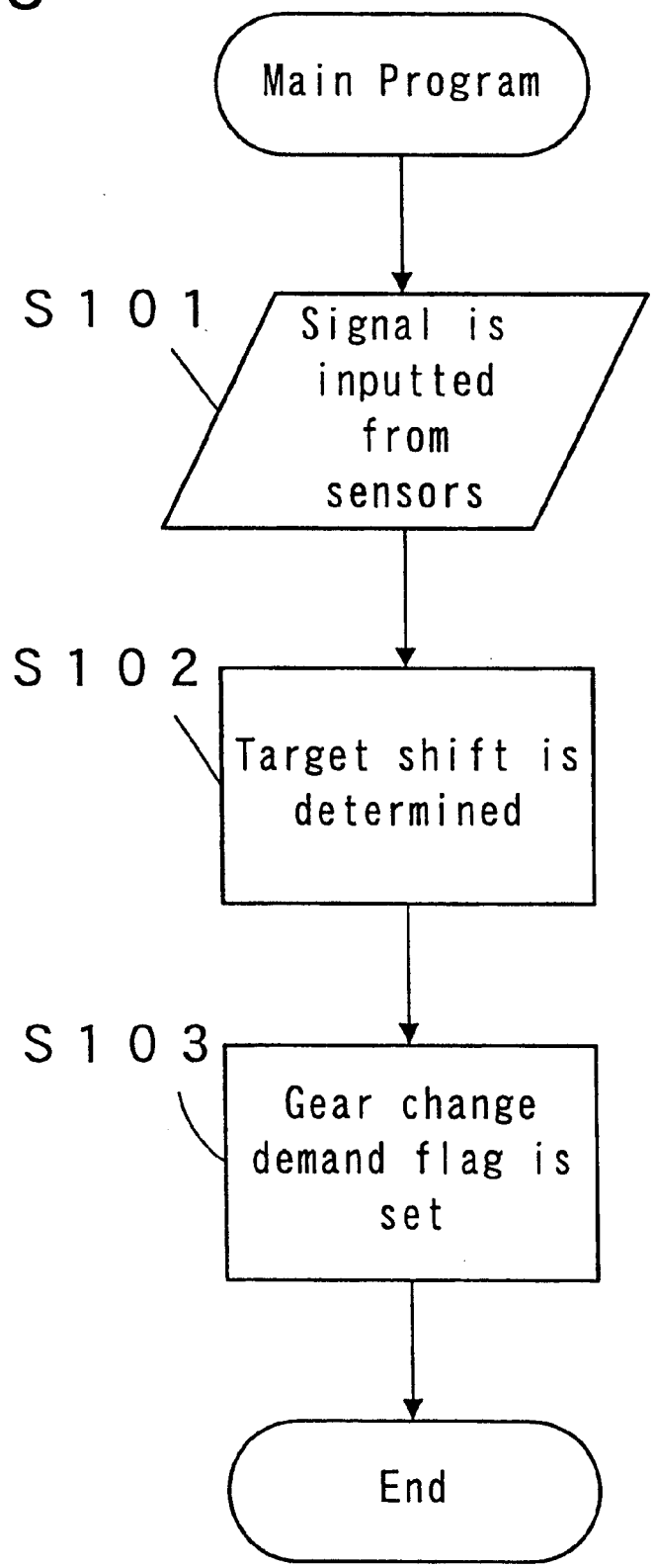
FIG. 5 is a flowchart showing a main program of FIG. 4.

The main program shown in FIG. 5 is repeatedly carried out after turning on the computer 92. Each time, a signal is inputted from sensors including the shift position sensor 94 in step S101 (hereinafter called S101). In S102, a target gear shift of the transmission 14 which should be selected this time is determined based on the inputted signal. For instance, whether gear shifting (gear ratio) of the transmission 14 to a first shift or to a second shift is appropriate is determined in S102. Data showing the determined target gear shift is memorized in the RAM 88.

In S103, a gear change demand flag shows that gear change demand is ordered at a set condition and that gear change demand is not ordered at a reset condition. The gear change demand flag provided on the RAM 88 is designed to be reset in response to turning on the electric source of the computer 92. One cycle of the main program is completed in the foregoing manner.

Figure 6:
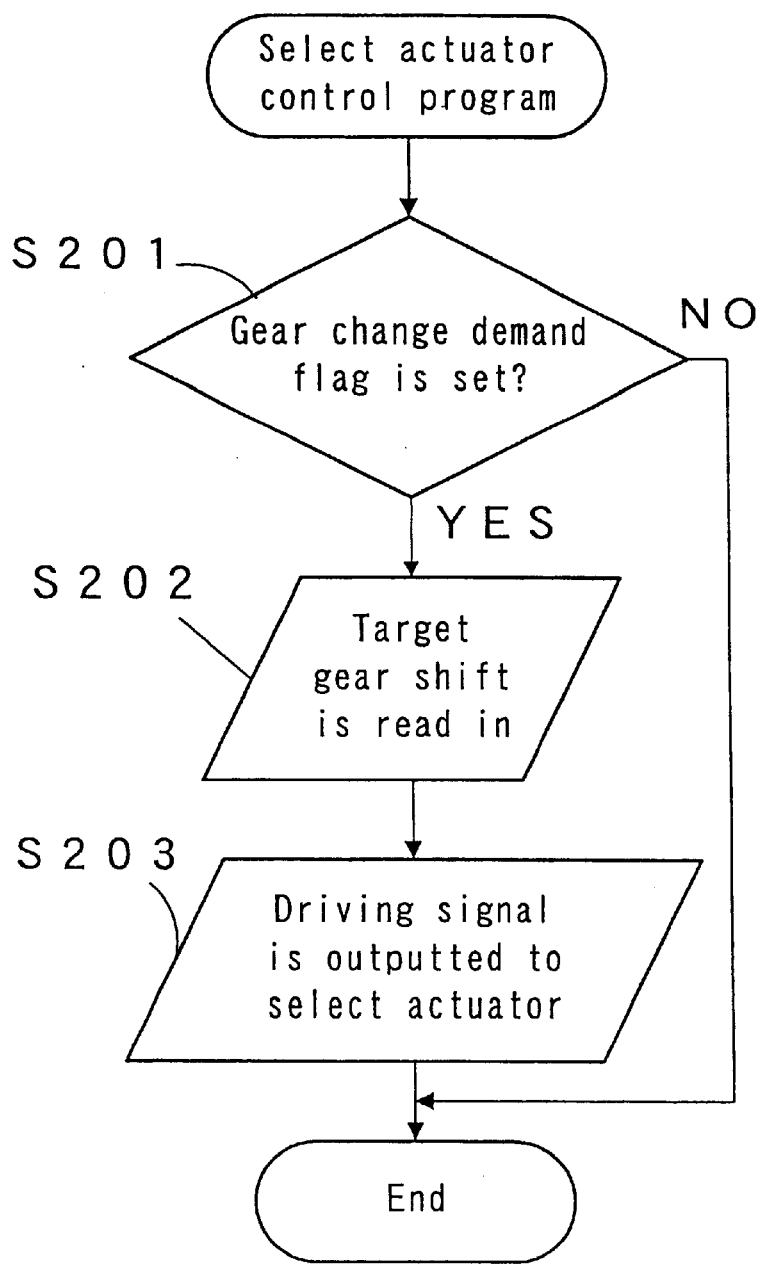
FIG. 6 is a flowchart showing a select actuator control program of FIG. 4.

The select actuator control program of FIG. 6 will be explained as follows. This program is also repeatedly carried out as is the main program. In S201, whether the gear change demand flag is set is judged. When the gear change demand flag is not set, judgment NO is selected to immediately end the program. On the contrary, when the gear change demand flag is set, the judgment YES is selected to advance the program to S202. In S202, the target gear shift is read in from the RAM 88. In S203, a driving signal necessary for selecting the target gear shift is outputted to the select actuator 62. As a result, the connecting portion 74 of the transmitting rod 70 is connected to one of the connecting portion 72 of plurality of shifting rods 68 corresponding to the target gear shift. One cycle of the program is completed in the foregoing manner.

Figure 7A:
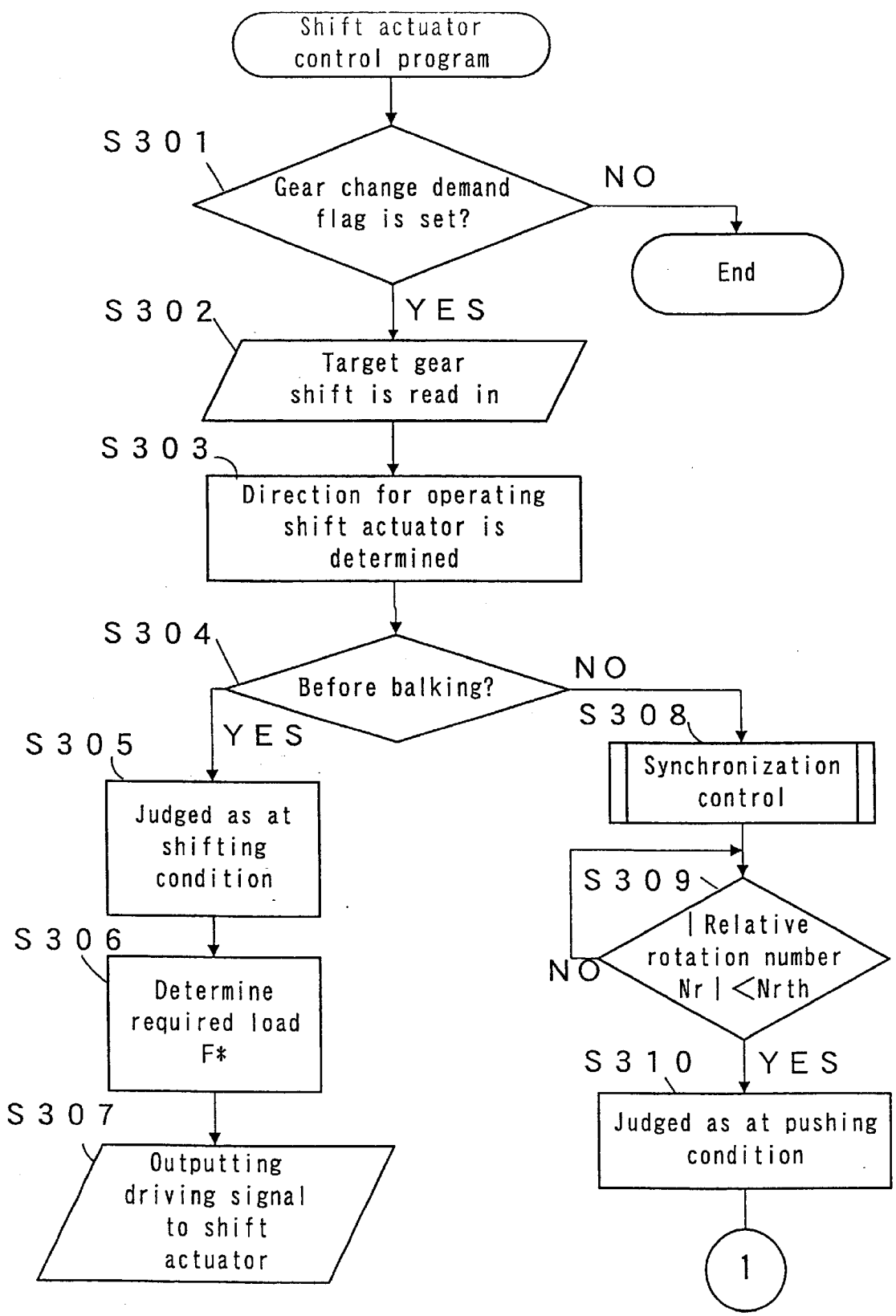
FIGS. 7a and 7b show a flowchart showing a shift actuator control program of FIG. 4.
Figure 7B:
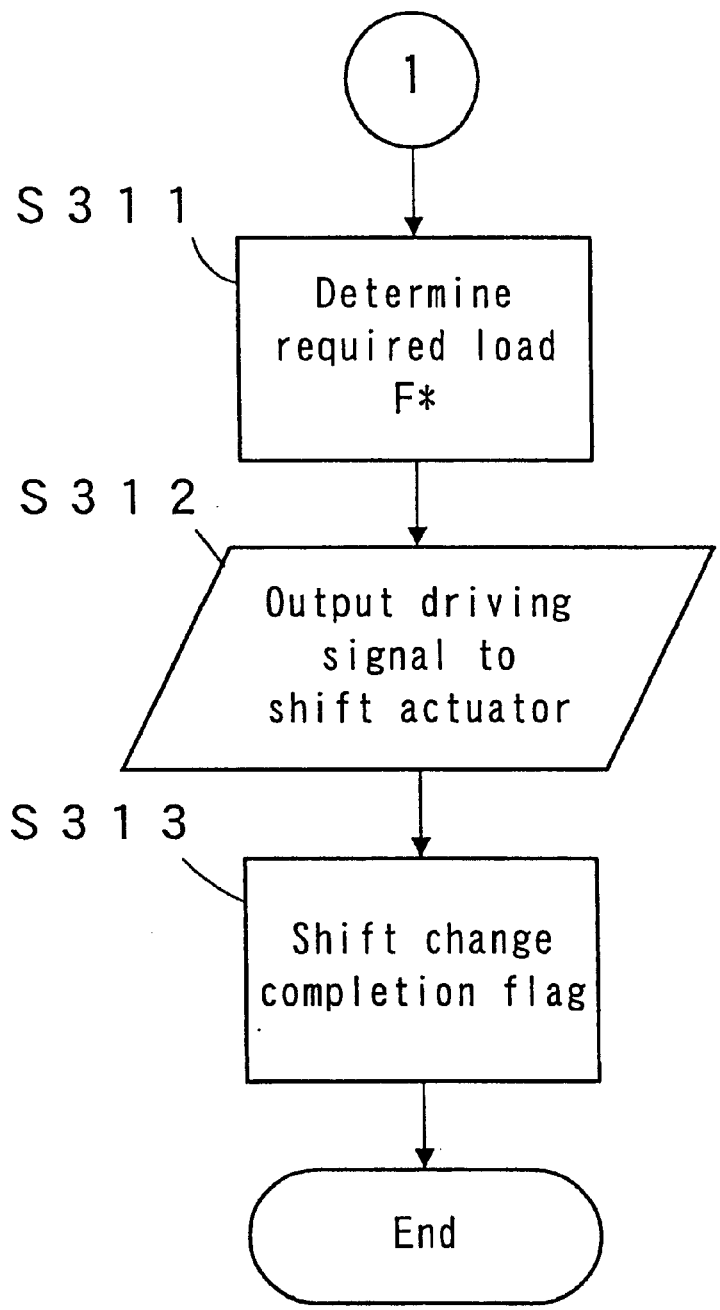

The shift actuator control program of FIGS. 7a, 7b will be explained as follows. This program is also repeatedly carried out. In S301, whether the gear change demand flag is set is judged. When the gear change demand flag is not set, judgment NO is selected and the program is immediately end.

On the contrary, when the gear change demand flag is set, judgment YES is selected in S302. In S302, the target gear shift is read-in from the RAM 88. In S303, a direction necessary for operating the shift actuator 60 in order to select the target gear shift is determined. That is, the direction for moving the sleeve 34 to intermesh the clutch 38 of the sleeve 34 selected by the select actuator 62 to either one of the clutches 48a, b is determined for achieving the target gear shift.

In S304, whether the state of operation is before balk, in which the advance of the sleeve 34 is disturbed by the synchronizer ring 46, is judged. In this judgment, for instance as is disclosed in the afore-mentioned publication, it is judged whether the absolute value of the differential value of the relative rotational number (i.e., the difference between the rotational number detected by the input rotational sensor 102 and the rotational number detected by the output rotational sensor 104) has or has not exceeded a threshold value. When the absolute value of the differential value of the relative rotational number has not exceeded the threshold value, it is judged that the sleeve 34 is under the condition before balk.

When it is judged that the sleeve is before balk, judgment YES is selected in S304 to move on to S305. In S305, it is judged that the sleeve 34 is at a shifting condition in which the shift lever is removed from the position (i.e., shifting transient position) for achieving the current gear shift to be inserted into the position for achieving the target gear shift in the transmission 14. The operation for retracting and inserting the sleeve 34 may be operated in the time synchronizer 30 or in two different synchronizers 30.

In S306, a required final load F* required to operate the sleeve 34 is determined to have an adequate strength for shifting operation. In S307, the sleeve 34 is moved in operational direction determined in S303, and a driving signal necessary for obtaining the required final load F* determined in S306 is outputted to the shift actuator 60. Then, the step is returned to S304.

As a result of repeating S304 through S307, the sleeve 34 contacts the synchronizer ring 46. When the sleeve 34 reaches the condition judged as a balk condition, the judgment NO is selected in S304 and thus the step is advanced to S308. In S308, synchronization control is conducted.

Figure 9A:
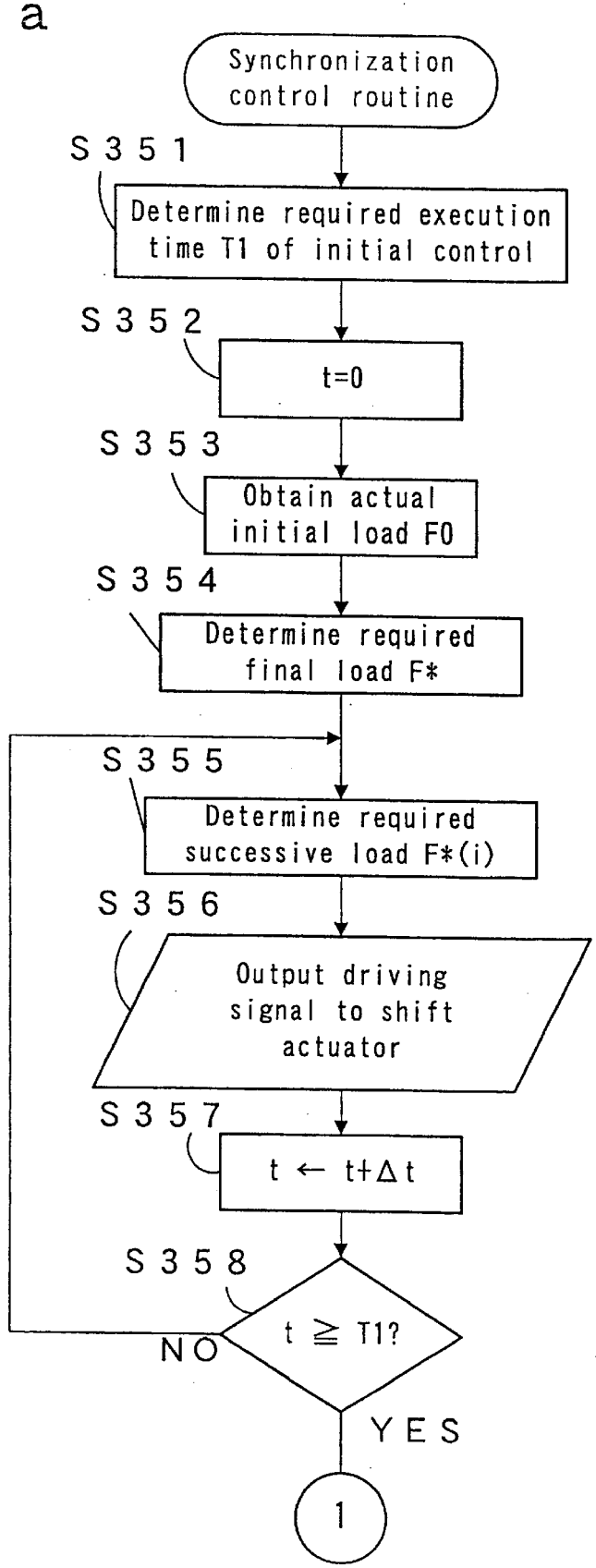
FIGS. 9a and 9b show a flowchart of a prior art synchronization control routine.
Figure 9B:
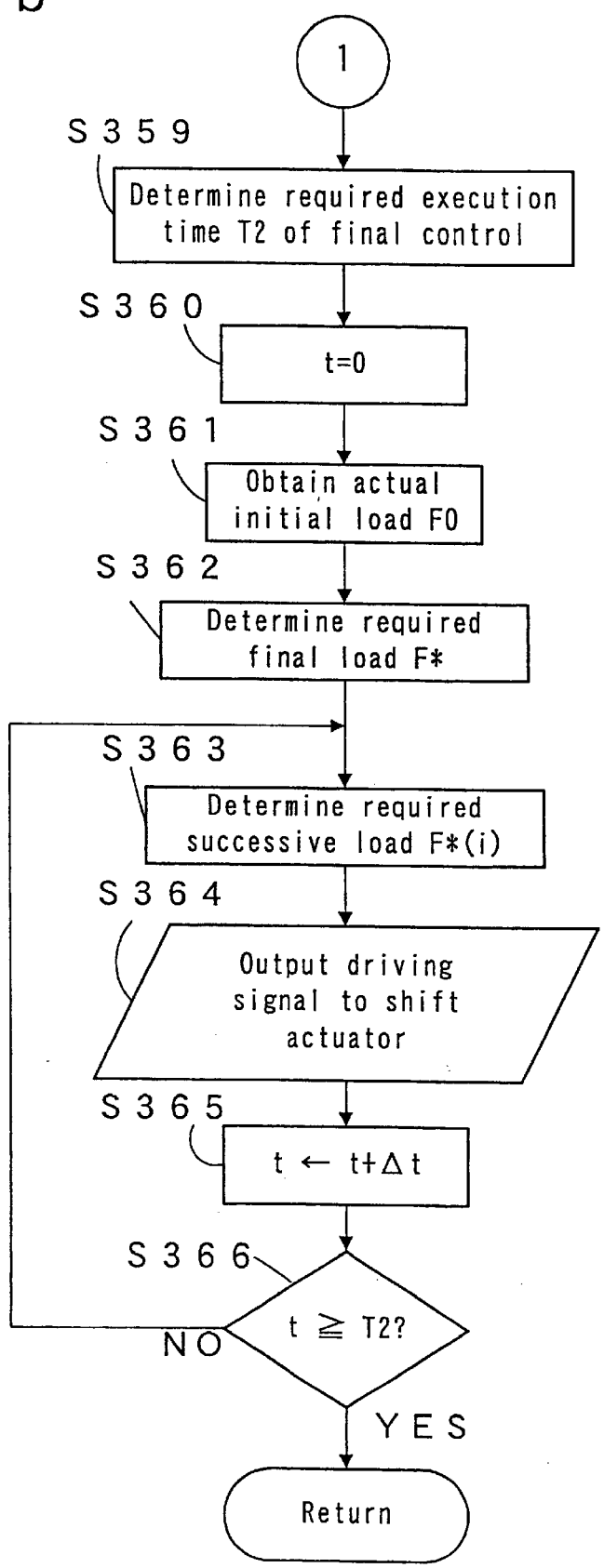

Details of S308 are shown in a flowchart of FIGS. 9a, 9b as a synchronization control routine. The synchronization control routine is carried out to control the shift actuator 60 with an initial control starting from a balk starting period and with the final control ending when synchronization is completed during the period from the balk starting period at which the sleeve 34 starts to contact the synchronizer ring 46 to the synchronization-completed period at which the synchronization is substantially completed.

Figure 10:
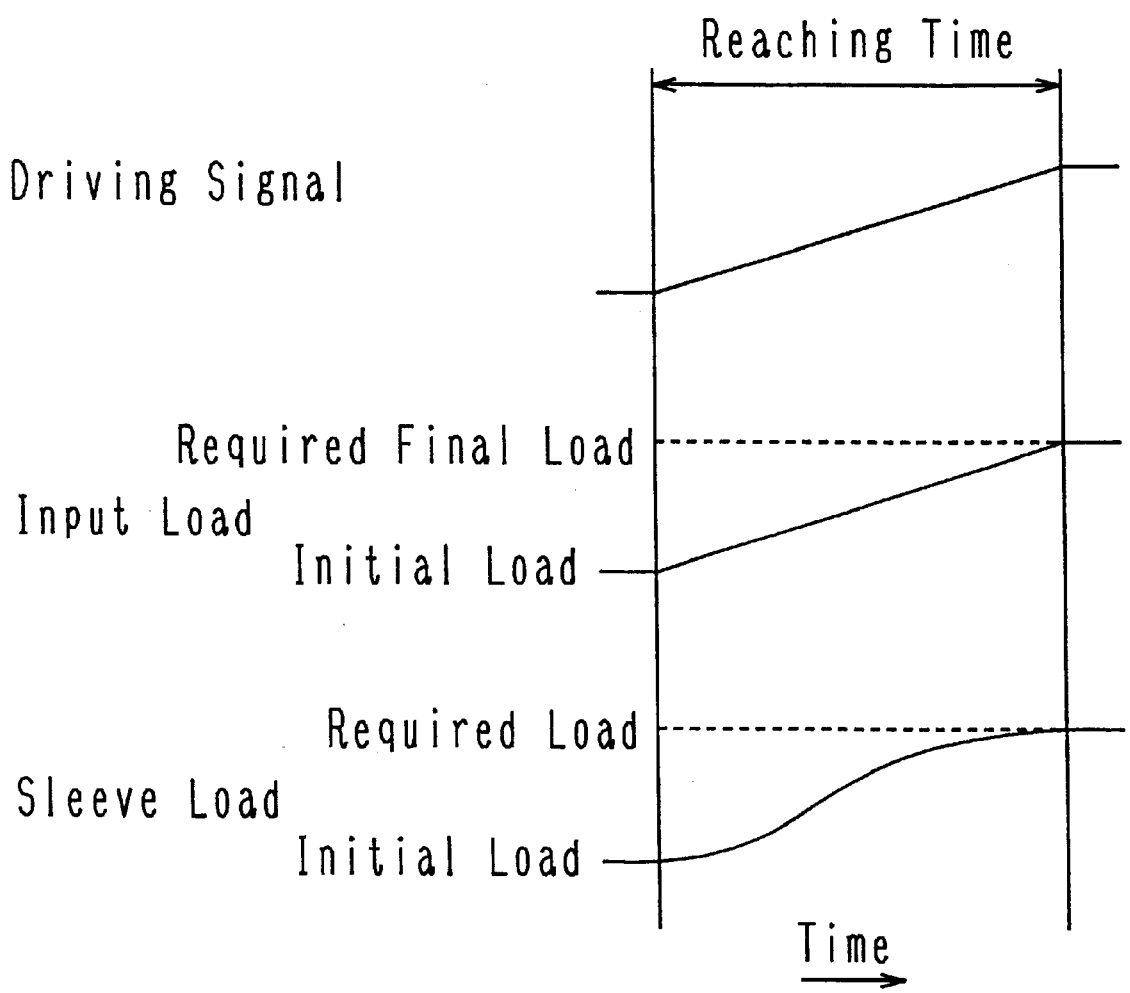
FIG. 10 is a graph showing relation between time and load pattern of a drive signal according to FIG. 9 along with an input load from a shift actuator to a transmitting rod and a load of a sleeve.

The synchronization control routine is carried out for supplying a driving signal, continuously varying with time, to the shift actuator 60 in both the initial control and the final control. In FIG. 10, an example of the driving signal is shown with time change. In FIG. 10 there is further included an input load inputted to the transmitting rod 70 from the shift actuator 60 in response to supplying the driving signal to the shift actuator 60, and a sleeve load F operating the sleeve 34 by transmitting the input load to the sleeve via the transmitting rod 70 and the shifting rod 68. In this case, the input load is equal to the load of the shift actuator 60 applied to the transmitting rod 70, that is, the generated load of the shift actuator 60. Under a normal condition, the magnitude of the input load corresponds to the sleeve load F.

The synchronization control routine is carried out to determine the length of reaching time corresponding to the time from start of supplying the driving signal to the shift actuator 60 to the reaching of the driving signal to a value corresponding to the required final load F*. At the initial control, the length of the reaching time is determined to be substantially equal to a half value of a vibration cycle $T_{VIB}$ of the sleeve load F. At the final control, the length of the reaching time is determined to be substantially equal to the value of the vibration cycle $T_{VIB}$.

The relationship between the length of reaching time of the driving signal and variations of control which includes the initial control and the final control is described below.

Figure 11:
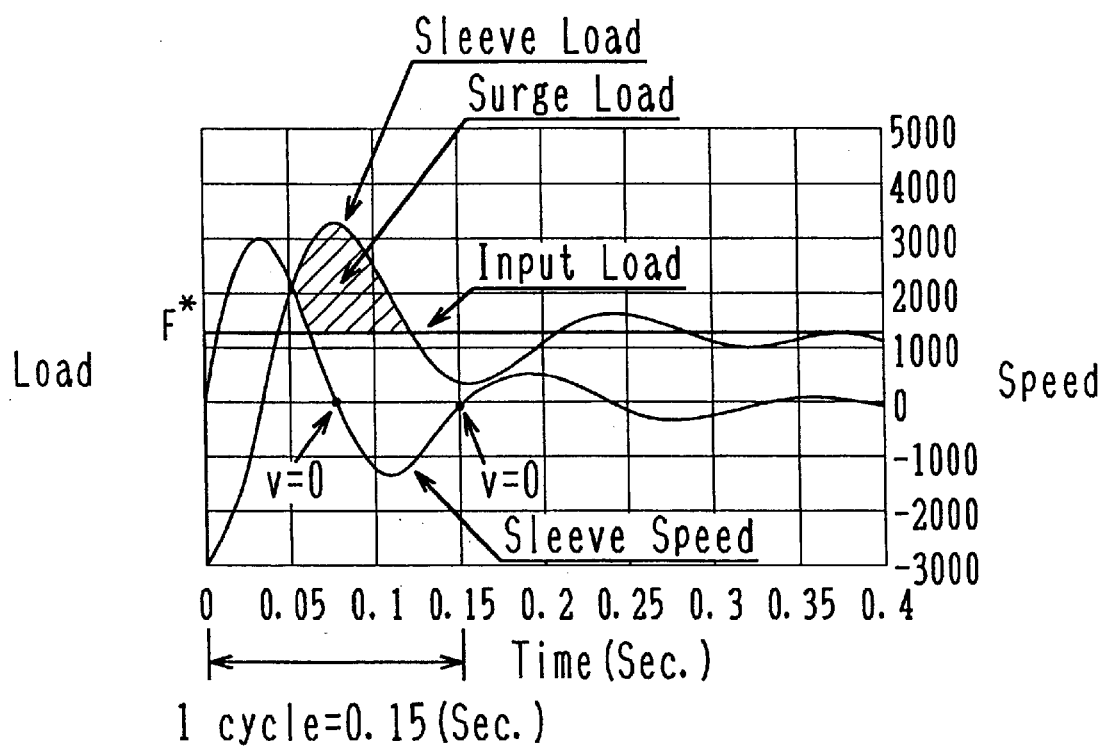
FIG. 11 is a graph for explaining the synchronization control routine of FIG. 9.

FIG. 11 shows the sleeve load F with time change, the input load, and the moving speed of the sleeve 34 when a step signal is supplied to the shift actuator 60 instead of consecutive driving signal at the stationary condition of the sleeve 34. As shown in FIG. 11, the input load reaches the required final load F* increasing in a vertically stepped manner. On the contrary, the sleeve load F reaches a normal value equal to the required final load F* after a transient state in which the value is largely fluctuated. The sleeve load F under the transient state is called surge load. The surge load transitory exceeds the required final load F*. The excessive surge load generates unpleasant noise and shock to the driver. The vibration cycle of the surge load, that is the vibration cycle $T_{VIB}$ of the sleeve load F is set to be 0.15 seconds in this embodiment.

Figure 12:
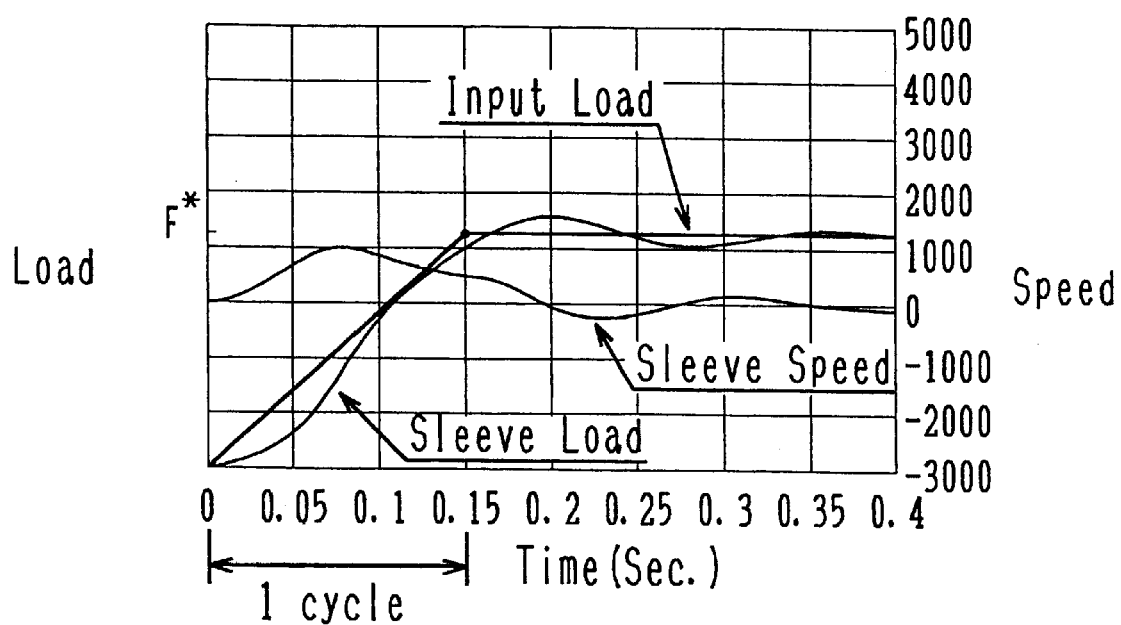
FIG. 12 is a graph for explaining final synchronization control routine of FIG. 9 and follows FIG. 13.

FIG. 12 shows the change of the sleeve load F, the input load, and the moving speed of the sleeve 34 along with time when the driving signal is continuously increasing to reach the value corresponding to the required final load F* is supplied to the shift actuator 60 during the time equal to the vibration cycle $T_{VIB}$ of the sleeve load F at the still state of the sleeve 34. As shown in FIG. 12, in this case, the input load continuously increases to the required final load F* during the time equal to the vibration cycle $T_{VIB}$ of the sleeve load F. In this case, as shown in FIG. 12, although the sleeve load F reaches the normal value equal to the required final load F* after a transient state in which the value is fluctuated, the fluctuation of the sleeve load F during the transient state is reduced as compared to the condition shown in FIG. 11; thus the generation of the surge load is adequately controlled.

Figure 13:
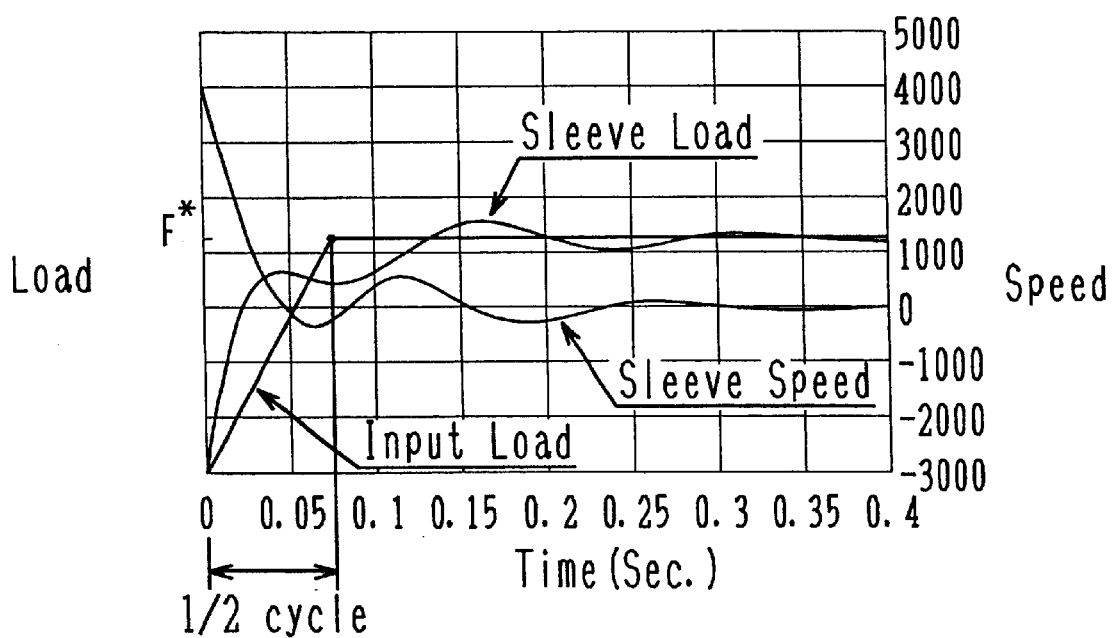
FIG. 13 is a graph for explaining the initial synchronization control routine of FIG. 9.

FIG. 13 shows the change of the sleeve load F, the input load, and the moving speed of the sleeve 34 with time, when the driving signal is continuously increasing to reach the value corresponding to the required final load F* supplied to the shift actuator 60 during the time equal to half of the vibration cycle $T_{VIB}$ of the sleeve load F at the still state of the sleeve 34. As shown in FIG. 13, the input load is continuously increased to the required load F during the time equal to a half value of the vibration cycle $T_{VIB}$ of the sleeve load F. Likewise with the condition shown in FIG. 12, in FIG. 13, although the sleeve load F reaches the normal value equal to the required final load F* after a transient state in which the value is fluctuated, the fluctuation of the sleeve load F during the transient state is reduced as compared to the condition shown in FIG. 11; thus the generation of the surge load is adequately controlled.

As shown in FIGS. 11–13, adjusting the reaching time of the consecutive driving signal supplied to the shift actuator 60 whether to the vibration cycle $T_{VIB}$ of the sleeve load F or to the half value of the vibration cycle $T_{VIB}$ of the sleeve load F depends on an initial speed Vo corresponding to a moving speed of the sleeve 34 at start of supplying the driving axial to the shift actuator 60. In other words, comparing the initial control (FIG. 13) and the final control (FIG. 12) from the view of the moving speed of the sleeve 34, the initial control is started from the start of balk of the sleeve 34, that is, started from the condition that the moving speed of the sleeve 34 is not substantially zero at which the sleeve 34 has not completely stopped. On the contrary, the final control is started from the condition in which the moving speed of the sleeve 34 is substantially zero and ended when the synchronization of the sleeve 34 is completed. Accordingly, in order to control the generation of the surge load in the sleeve 34, it is effective to adjust the length of the reaching time of the driving signal to the half value of the vibration cycle of the sleeve load F in the initial control. On the contrary, in order to control the generation of the surge load in the sleeve 34 at the final control, it is effective to adjust the length of the reaching time of the driving signal with the vibration cycle $T_{VIB}$ of the sleeve load F.

Accordingly, in the synchronization control routine of the first embodiment of the present invention, the length of reaching time of the driving signal is determined to be substantially equal to the half value of the vibration cycle $T_{VIB}$ of the sleeve load F at the initial control and the length of reaching time of the driving signal is determined to be substantially equal to the vibration cycle $T_{VIB}$ at the final control.

In the forgoing synchronization control routine, during both the initial control and the final control, the pattern of varying the driving signal continuously in accordance with the passage of time is determined so that the initial load Fo which is the sleeve load F at start of control reaches to the required final load F* which is the required load at ending control.

As shown in FIG. 10, the pattern of the driving signal continuously varying in accordance with the passage of time achieves a result that the input load increases with a constant inclination from the initial load F to the require final load F* in the first embodiment. Other patterns of the driving signal continuously varying in accordance with the passage of time can be adopted. For example, a pattern in which the inclination is gradually increased from zero to the maximum value and then the inclination is gradually reduced to reach the required final load F* can be adopted.

Further, in this synchronization control routine, following the determined pattern, the input load determines a plurality of required successive loads F*(i) based on the initial load Fo and the required final load F*. The plurality of the required successive loads F* (i) is, for example, determined by complementing equation of n-th power memorized in the ROM 86.

In the synchronization control routine of the first embodiment, in both initial control and the final control, the required execution time T1, T2 for the control, that is the length of time for continuously supplying the driving signal to the shift actuator 60 is determined to be equal to the reaching time.

As shown in FIGS. 12, 13, the required execution time T1, T2 of each control can be determined to be longer than the reaching time considering that the sleeve load F is adequately stabilized after the input load reaches the normal value, that is after passing the reaching time of the driving signal. For example, the length of the required execution time T1, T2 can be determined equal to a stabilized time of the sleeve load F.

Comparing a first case wherein the required execution time T1, T2 is determined as equal to the reaching time, with a second case wherein the required execution time T1, T2 is determined as equal to the stabilized time of the sleeve load F, the first case has an advantage that the execution time of each control can be shortened, thus easily speeding-up the shifting operation of the transmission 14. On the contrary, the second case has an advantage that the stability and the control accuracy of the sleeve load F at each control can be easily improved, thus controlling the generation of the unpleasant noise and the shock for the vehicle driver.

As shown in FIGS. 9a, 9b, in the synchronization control routine, the length of required execution time T1 of the initial control is determined as substantially equal to the half value of the vibration cycle $T_{VIB}$ of the sleeve load F at S351. The vibration cycle $T_{VIB}$ of the sleeve load F is memorized in the ROM 86 as a standardized fixed value evaluated by designing or experiment. At S352, a passing time (t) is reset to zero. At S353, the load of the transmitting rod 70 at the start of the initial control is obtained as the actual initial load Fo.

At S354, the required final value of the input load, that is the required final load F* of the sleeve load F, is determined. The required final load F* can be determined as a fixed value or as a variable value based on, for instance, the relative rotational number at the start of the initial control and the required execution time T1.

At S355, the successive required value of the input load, that is the required successive load F*(i) supposed to be outputted to the transmitting rod 70 from the shift actuator of this time is determined based on the actual initial (first) load Fo, the required final load F*, and the required execution time T1, that is, the reaching time. At S356, the driving signal necessary for obtaining the determined required successive load F*(i) of this time is outputted to the shift actuator 60.

At S357, the passing time (t) is renewed by adding the increment Δt to the current value of the passing time (t). The length of the increment Δt is determined, for example, based on the time necessary for carrying out S355 and S356. At S358, whether the renewed passing time (t) is greater than required execution time T1 is judged, That is, whether the initial control is completed is judged. When the passing time (t) is not greater than required execution time T1, judgment NO is selected and the step is returned to S355. When the passing time (t) becomes greater than required execution time T1 after repeating the steps S355 through S358, the judgment YES is selected and the initial control of this time is completed.

S359 through S366 is carried out for the final control following the S351 through S358. At S359, the length of the required execution time T2 of the final control is determined to be substantially equal to the vibration cycle $T_{VIB}$ of the sleeve load F. At S360, the passing time (t) is reset to zero. At S361, the actual initial load Fo is obtained as is the process at S353.

At S362, the required final load F* of the sleeve load F is determined. The required final load F* is determined to have an adequate magnitude to substantially completely end the synchronization at a passing of the required execution time T2. In the first embodiment, the required final load F* is determined to be a value greater than the required final load F*. The reason why the required final load F* of the initial control is determined to be smaller than that of the final control in a series of the synchronization control is to control the generation of the noise and the shock at the initial stage, irrespective of the characteristics of the initial stage that the tendency of high frequency of generating unpleasant noise send shock for the drive due to the hitting of the sleeve 34 to the synchronizer ring 46.

At S363, the required successive load F*(i) to be outputted to the transmitting rod 67 from the shift actuator 60 of this time is determined as is the process in S355. At S364, the driving signal necessary for obtaining the determined required successive load F* (i) of this time is outputted to the shift actuator 60.

At S365, as in the same manner with S357, the passing time (t) is renewed by adding the increment Δt to the current value of the passing time (t). At S366, whether the renewed passing time (t) is greater than the required execution time T2 is judged. That is, whether the final control is completed is judged. When the passing time (t) is not greater than required execution time T2, the judgment NO is selected and the step is returned to S363. When the passing time (t) becomes greater than the required execution time, T2 after repeating S363 through S366, the judgment YES is selected at S366 and thus the final control of this time is completed.

Then at S309, it is judged whether a relative rotational number Nr between the sleeve 34 and the idling gear in accordance with the target gear shift is smaller than a threshold value Nrth close to zero based on an output signal from the input rotational sensor 102 and the output rotational sensor 104. That is, it is judged whether continuation of the synchronization control is not necessary. When the relative number Nr is not smaller than the threshold value Nrth, the judgment NO is selected. In this case, in order to continue the synchronization of this time, the driving signal to the shift actuator 60 is maintained at the value for obtaining the required final load F* determined at S362 of FIG. 9b. When the relative rotational number Nr becomes smaller than the threshold value Nrth, the judgment YES is selected at S309 of FIG. 7a and the step is advanced to S310.

At S309, it is judged that the sleeve 34 is currently at pushing. That is, it is judged that the teeth of the clutch 38 of the sleeve 34 are in an advancing condition pushing their way through the teeth of the synchronizer ring 46 and the clutch teeth 48 of a gear for achieving the target gear shift at the condition in which the synchronization of the sleeve 34 and the gear for achieving the target gear shift is completed. At S311, the required final load F* required to operate the sleeve 34 is determined to have a magnitude adequate for pushing movement of the sleeve 34.

At S312, the driving signal necessary for moving the sleeve 34 in the operational direction determined in S303 and for obtaining the required final load F* determined at S311 is outputted to the shift actuator 60. At S313, a shift change completion flag showing the completion of the gear shifting control of this time at set condition and showing the in-completion of the gear shifting control of this time at a reset condition is set. The shift change completion flag is provided in the RAM 88 and reset in accordance with turning on the computer 92. One cycle of the shift actuator control program is completed in the foregoing manner.

Figure 8:
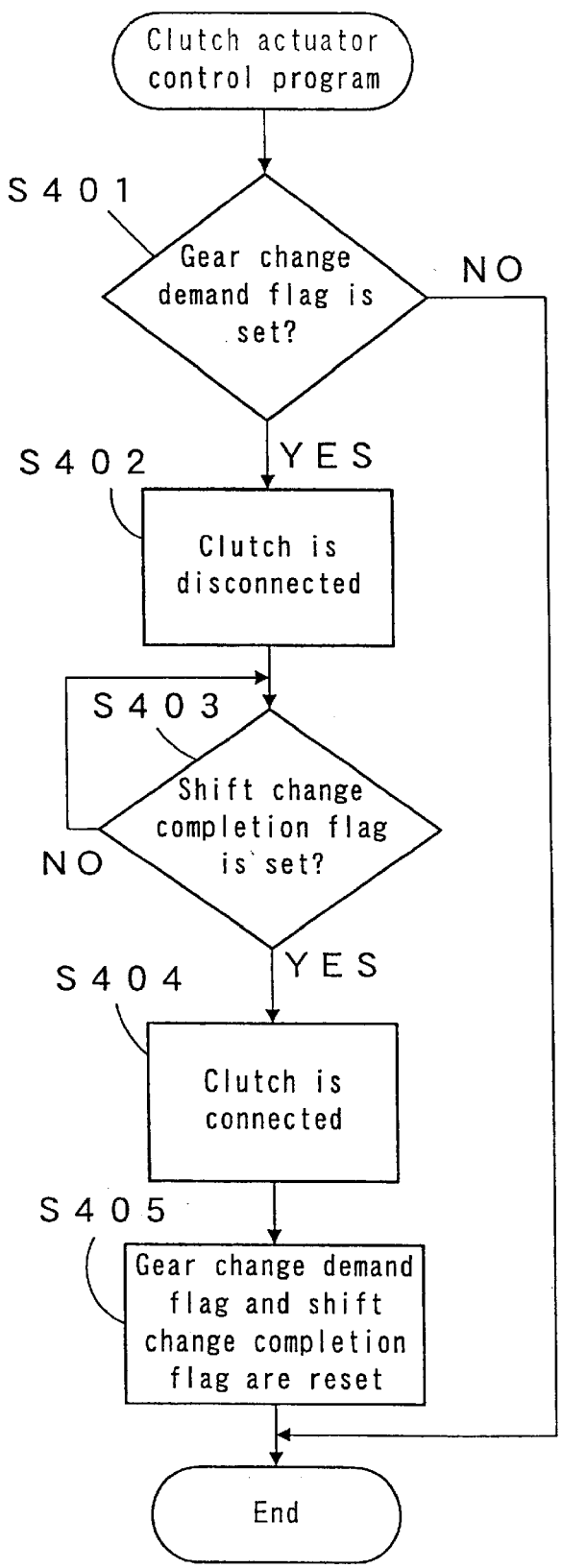
FIG. 8 is a flowchart showing a clutch actuator control program of FIG. 4.

The clutch actuator control program of FIG. 8 is repeatedly carried out in the manner of other programs explained above. At S401, whether the gear change demand flag is set is judged. When the gear change demand flag is not set, the judgment No is selected and thus to immediately end the program.

On the other hand, when the gear change demand flag is set, the judgment YES is selected at S401 and the step is advanced to S402. At S402, the driving signal necessary for switching the clutch 12 from a connected condition to a disconnected condition is outputted to the clutch actuator 80.

At S403, the shift change completion flag is preparing for setting. When the shift change completion flag is set, the driving signal necessary for switching the clutch 12 from the disconnected condition to the connected condition is outputted to the clutch actuator 80 at S404. At S405, the gear change demand flag and the shift change completion flag are reset. One cycle of the clutch actuator control program is completed in the foregoing manner.

Apparent from the foregoing explanation, in the first embodiment of the present invention, the shift actuator 60 constitutes an example of an actuator according to the present invention. The ECU for gear shifting 82 constitutes an example of a controller according to the present invention. A portion for carrying out the synchronization control routine of FIG. 9 in the ECU for gear shifting 82 constitutes an example of a pattern variation means according to the present invention.

Figure 14:
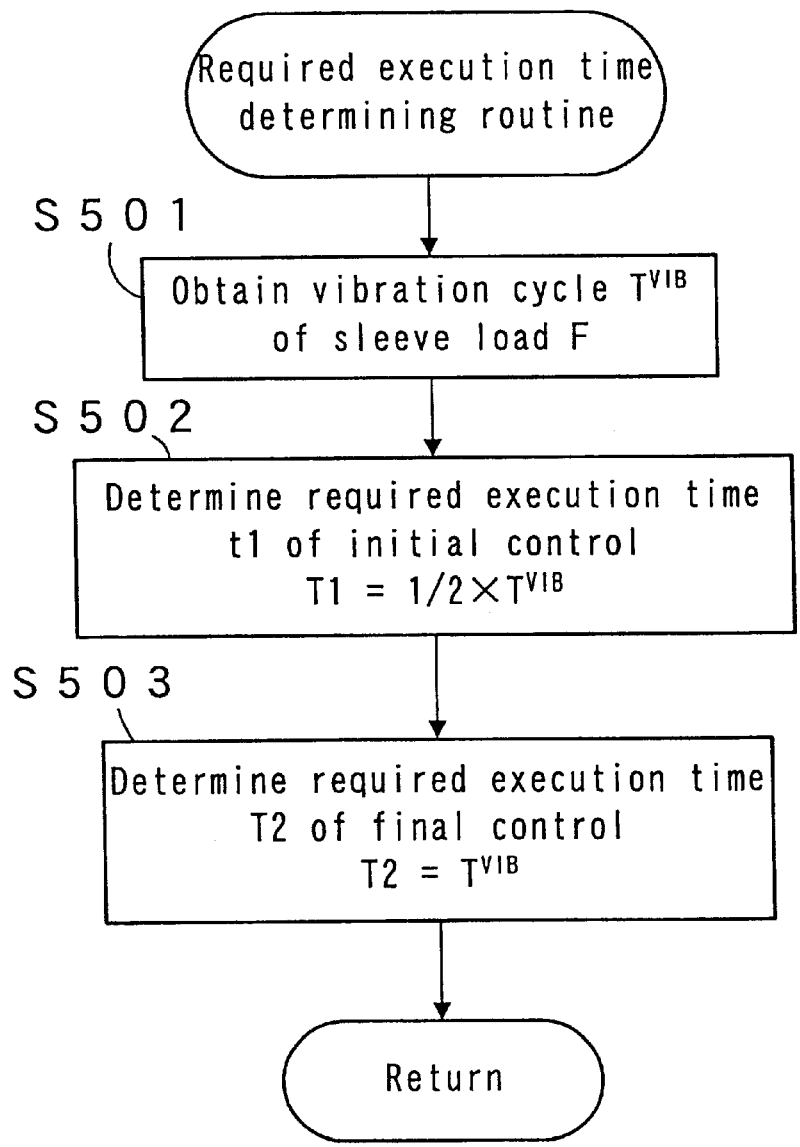
FIG. 14 is a flowchart showing a required practice time determining routine carried out by a computer of the ECU for gear shifting of the gear shifting control device for the synchromesh transmission of according to a second embodiment of the present invention.

FIG. 14 shows a flowchart of a portion of the synchronization control routine as a required execution time determining routine corresponding to S351 and S359 of FIGS. 9a, 9b memorized in the ROM 86 of the computer 92.

In the required execution time determining routine of the second embodiment, the actual vibration cycle $T_{VIB}$ of the sleeve load F is measured, and the length of the reaching time of the driving signal supposed to be supplied to the shift actuator 60 is determined. The length of the reaching time of the driving signal is determined to be substantially equal to half of the actual value of the vibration cycle $T_{VIB}$ of the sleeve load F at the initial control. On the other hand, the length of the reaching time of the driving signal is determined to be substantially equal to the actual value of the vibration cycle $T_{VIB}$.

In the required execution fine determining routine, the length of a required execution time T is determined to be equal to the determined reaching time in both the initial control and the final control.

In the required execution time determining routine, the vibration cycle $T_{VIB}$ of the sleeve load F is obtained based on the output signal of the first load sensor 100 at S501.

Figure 15:
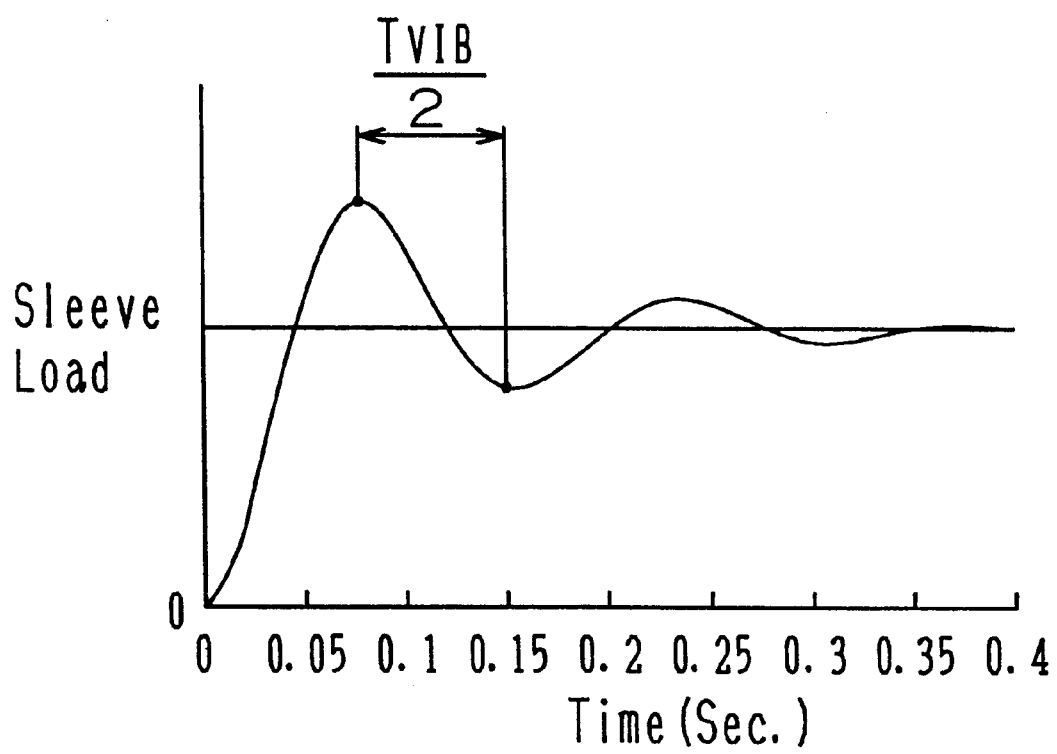
FIG. 15 is a graph for explaining the required practice time determining routine of FIG. 14.

At a very first synchronization for vehicle, a step signal is supplied to the shift actuator 60 instead of the consecutive signal. Periods are detected at which the sleeve load F in response to the step signal showing a top peak value (maximum value) and a bottom peak value (minimum value), based on the output signal of the first load sensor 100. FIG. 15 shows the top peak value and the bottom peak value of the sleeve load F. The interval of two periods showing the top peak value and the bottom peak value corresponds to a half value of the vibration cycle $T_{VIB}$ of the sleeve load F. According to the second embodiment, the interval of two periods are actually measured and the doubled measured interval is actually measured as the vibration cycle $T_{VIB}$ of the sleeve load F. The measured vibration cycle $T_{VIB}$ is memorized in the RAM 88. At the first synchronization of one vehicle driving, the vibration cycle $T_{VIB}$ is obtained by actual measurement. Regarding the synchronization control after a second time of the same vehicle driving, the vibration cycle $T_{VIB}$ is read-out from the RAM 88.

At S502, the length of the required execution time T1 of the initial control is determined to be equal to a half value of the obtained vibration cycle $T_{VIB}$. At S503, the length of the required execution time T2 of the final control is determined to be equal to the vibration cycle $T_{VIB}$. One cycle of the required execution time determining routine is now completed.

As should be apparent from the foregoing explanation, in the second embodiment, the shift actuator 60 corresponds to an example of an actuator of the present invention. The ECU for gear shifting 82 corresponds to an example of a controller according to the present invention. A portion for carrying out the required execution time determining routine of FIG. 14 in the ECU for gear shifting 82 corresponds to an example of a pattern variation means according to the present invention. The first load sensor 100 corresponds to an example of a vibration cycle related amount sensor according to the present invention. A portion of the ECU for gear shifting 82 for carrying out S501 corresponds to an example of a vibration cycle obtaining means according to the present invention. A portion of the ECU for gear shifting 82 carrying out S502 and S503 corresponds to an example of a pattern varying means according to the present invention.

The effects of the embodiments of the present invention will be shown as follows.

In the gear shifting control device according to the present invention, the driving signal continuously varying in accordance with time is supplied to an actuator when it is necessary to change the actual value of the sleeve load from a current value to a required value. Accordingly, compared to an intermittently varying step signal being supplied to the actuator, the fluctuation of a sleeve at a transient state of the load is reduced, and as a result, the control accuracy of the sleeve load is improved.

As a power source, an engine (a combustion engine), an electric motor or both engine and the electric motor can be employed.

A controller (a shift change ECU) may be a type for controlling an actuator mainly by an output signal from a sensor for detecting driver's intention regarding shift change, for instance a sensor for detecting the manual operation of a shifting operation member such as shift lever. The controller may be a type for controlling the actuator mainly by a sensor for detecting the driver's intention regarding the vehicle acceleration, for instance, a sensor for detecting the operation of the accelerating operating member such an throttle pedal and a sensor for detecting the vehicle condition for instance a sensor for detecting the rotational number of the power source. Generally, in vehicles provided with a synchromesh transmission, a clutch is provided between the power source and the transmission for connecting and disconnecting the power source relative to the transmission. As a clutch, there can be used a manually operated type that is directly operated by the driver and an automatically operated type that is operated by electrically controlled actuator. When the automatic clutch is adopted, the controller of the present invention can be a type for controlling an actuator of a clutch associated with an actuator for controlling the sleeve.

At least one synchronizer is used in the transmission. The synchronizer is generally structured to select one of two sets of gear mates as an effective (active) gear mate.

An actuator may be an electric driving source type for controlling the power from an electric power source such as a motor by electrically controlling a power source or controllers connected to the power source. The actuator may be a pressure power source type for controlling the pressure from the pressure source generating the pressure such as a pump and an accumulator by electrically controlling the pressure power source or the controllers such as a solenoid valve connected to the pressure source.

A transmitting mechanism can be provided with a single member or with a plurality of members mutually connected.

A gear shifting control device is applicable to a transmission in which a shaft connected to driving wheels, and the non-idling side of a gear mate is connected to the driving source. The gear shifting control device is applicable to a transmission in which the shaft is connected to the driving source, and the non-idling gear is connected to driving wheels.

The present inventors have discovered that it is effective to determine a pattern of the driving signal continuously varying in accordance with time considering an initial speed which is a speed of the sleeve or member (e.g., a component of the transmitting mechanism) moved with the sleeve at the start of supplying the driving signal to the actuator, in order to control the fluctuation of the sleeve load at transient state and to improve the control accuracy of the sleeve load. That is because the characteristics of the fluctuation of the sleeve load at the transient state depend on its initial speed, i.e., kinetic energy.

Further, according to the inventors' discovery, it is effective to determine the pattern of the driving signal considering the vibration cycle when the sleeve load is oscillated in response to the step signal when the step signal is supplied to the actuator. That is because the characteristics of the fluctuation of the sleeve load at transient state depend on its vibration cycle.

Accordingly, in the gear shifting control device, the pattern of the driving signal continuously varying in accordance with time is varied based on at least one of: the initial speed which is the speed of the sleeve or member moved with the sleeve, and the vibration cycle of the sleeve load. Hence, according to the gear shifting control device, the pattern of the driving signal can be easily suited in relation to the characteristics of the fluctuation of the sleeve load at transient state and thus easily improve the control accuracy of the sleeve load.

According to the inventors' discovery, it is effective to establish constant relations between the length of a reaching time and at least one of the initial speed and the vibration cycle in order to improve the control accuracy of the sleeve load by controlling the fluctuation of the sleeve load at the transient state. The reaching time corresponds to a period from a start of supplying the driving signal to the actuator until the driving signal reaches the value corresponding to a required value.

Accordingly, in the gear shifting control device, the length of the reaching time of the driving signal can be varied based on at least one of the initial speed and the vibration cycle. Hence, the actuator can be controlled to establish a proper relation between the length of the reaching time which is an element for determining the pattern of the driving signal and at least one of the initial speed and the vibration cycle for controlling the fluctuation of the sleeve load at transient state. Thus, the control accuracy of the sleeve load can be easily improved.

According to the inventors' discovery, it is effective to establish a relation between the appropriate value of the reaching time of the driving signal, the initial speed, and the vibration cycle of the sleeve load in order to improve the control accuracy of the sleeve load by controlling the fluctuation of the sleeve load at transient state, which relation is that: the length of the reaching time is substantially equal to the vibration cycle of the sleeve load when the initial speed is substantially zero, and the length of the reaching time is substantially equal to a half value of the vibration cycle when the initial speed is not substantially zero.

Accordingly, in the gear shifting control device, the length of the reaching time is determined to be substantially equal to the vibration cycle when the initial speed is substantially zero. The length of the reaching time is determined to be substantially equal to the half value of the oscillation when the initial speed is not substantially zero. Hence, the length of the reaching time, which is one element for determining the pattern of the driving signal, can be suited in relation with the initial speed and the vibration cycle and thus to easily improve the control accuracy of the sleeve load.

The vibration cycle of the sleeve load is not always the same between synchronizers and is varied due to manufacturing variances. In order to suit the pattern of the driving signal in relation with the sleeve load and the oscillation load irrespective of such variances, it is desirable that the actual value of the vibration cycle of the sleeve load regarding each synchronizer is obtained and the result is reflected to the pattern of the driving signal.

Accordingly, in the gear shifting control device, the physical quantity varying in accordance with the vibration cycle of the sleeve load is detected and the actual vibration cycle of the sleeve load is obtained based on the result. Further, the pattern of the driving signal is varied based on the obtained vibration cycle. Hence, the pattern of the driving signal can be easily suited in relation with the vibration cycle of the sleeve load irrespective of the dispersion of the synchronizer.

A vibration cycle related amount sensor may correspond to an example of a sensor for detecting the sleeve load and the load related to the sleeve load. It is because the passage of time of the sleeve load and the load related to the sleeve load are also varied in accordance of the variation of the vibration cycle of the sleeve load. Further, the vibration cycle related amount sensor may correspond to a sensor for detecting the moving position and the moving speed of the sleeve or the members moved with the sleeve. That is because, as shown in FIGS. 11 through 13, the sleeve speed which is the moving speed of the sleeve varied while keeping a constant relationship with the sleeve load and the moving speed can be obtained by the time differentiation of the moving position. Further, the vibration cycle related amount sensor may correspond to a sensor for detecting the rotational number of the idling gear having a clutch to be intermeshed with the clutch of the sleeve. That is because the rotational number is varied, keeping a constant relationship with the sleeve load.

According to the gear shifting control device, the pattern of the driving signal can be easily suited to the initial speed because the initial speed of the sleeve and the members moved with the sleeve is obtained and the pattern of the driving signal is varied based on the obtained initial speed.

A speed related amount sensor may correspond to a sensor for detecting the speed of the sleeve and the members moved with the sleeve. The speed related amount sensor may also correspond to a sensor for detecting the physical quantity related to the speed and other measures, for instance, the moving position of the sleeve and the members moved with the sleeve. It is because the time differentiation value of the moving position shows the moving speed.

Regarding the synchronizer, generally, the moving speed of the sleeve is not substantially zero at the start of balk in which the sleeve started to contact the synchronizer ring. On the other hand, the moving speed of the sleeve is substantially zero after the start of balk and close to the end of synchronization.

It is effective to establish the following relationship between the appropriate value of the reaching time of the driving signal, the initial speed, and the vibration cycle of the sleeve load, in order to improve the control accuracy of the sleeve load by controlling the fluctuation of the sleeve load at transient state. Such relationship is that the length of the reaching time is substantially equal to the vibration cycle of the sleeve load when the initial speed is substantially zero and that the length of the reaching time is substantially equal to the half value of the vibration cycle when the initial speed is not substantially zero.

Accordingly, in the gear shifting control device, the actuator is controlled by having an initial control which starts at the start of balk (in which the balk is substantially started) to the synchronization completion (in which the synchronization is substantially completed). Further, the length of the reaching time, which is an element for determining the pattern of the driving signal, is determined as substantially equal to the half value of the vibration cycle of the sleeve load at the initial control, and the reaching time is determined as substantially equal to the vibration cycle at the final control. Accordingly, the sleeve load can be controlled with high accuracy by using the constant relationship between the time for controlling the sleeve load and the moving condition of the sleeve without being indispensable with detecting the moving speed of the sleeve.

Generally, when the step signal is supplied to the actuator at the start of balk and completion of the synchronization, the sleeve load tends to fluctuate in response to the step signal.

In the gear shifting control device, a driving signal continuously varied in accordance with time is supplied to the actuator at the start of balk and completion of the synchronization. Thus, according to the gear shifting control device, the start of balk and the completion of the synchronization can be effectively controlled.

The principles, preferred embodiments and modes of operation of the present invention have been described in the foregoing specification. However, the present invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A gear shifting control device for a synchromesh transmission transmitting rotation from a power source to driving wheels, comprising:
    first and second sets of intermeshed mating gears having different respective gear ratios;
    a synchronizer for selecting one of the sets of mating gears, the synchronizer comprising:
        a shaft on which one of the gears of one the sets of mating gears is mounted for rotation relative thereto to define an idling gear;
        a sleeve mounted on the shaft for rotation therewith and movable relative thereto in an axial direction defined by a center axis of the sleeve;
        a synchronizer ring rotatable relative to the idling gear and relatively movable thereto in the axial direction;
        a frictional surface rotatable with the idling gear;
        a first clutch rotatable with the sleeve; and
        a second clutch rotatable with the idling gear;
        the sleeve being movable in the axial direction to contact the synchronizer ring;
        the idling gear and the sleeve being synchronized with one another in response to the synchronizer ring being pressed against the frictional surface, whereby the first clutch and the second clutch are balked;
    an actuator for generating a load for moving the sleeve in the axial direction and electrically controlled in accordance with an external signal;
    a transmitting mechanism for transmitting the generated load by the actuator to the sleeve; and
    a controller for controlling the actuator for varying the gear ratio of the transmission based upon at least one of: a driver's intention, vehicle condition, and a condition of the transmission; the controller arranged for supplying to the actuator a driving signal continuously varying in accordance with time when changing an actual value of the sleeve load operating the sleeve to a required value different from a current value;
    wherein the controller includes a pattern varying means for varying a pattern of the driving signal in accordance with time, the pattern being varied based on at least one of: an initial speed which corresponds to a speed of the sleeve or a member moved with the sleeve at a start of supplying the driving signal to the actuator, and a vibration cycle which corresponds to a vibration cycle of the sleeve load in response to a step signal when the step signal is supplied to the actuator.

2. The gear shifting control device for a synchromesh transmission according to claim 1, wherein the pattern varying means is arranged to vary a length of a reaching time from a start of supplying the driving signal to the actuator until the driving signal reaches a value corresponding to the required value based on at least one of: the initial speed and the vibration cycle.

3. The gear shifting control device for a synchromesh transmission according to claim 2, wherein the pattern varying means is arranged to determine the length of the reaching time substantially equal to the vibration cycle when the initial speed is zero, and to determine the length of the reaching time substantially equal to a half value of the vibration cycle when the initial speed is not zero.

4. The gear shifting control device for a synchromesh transmission according to claim 2, wherein the pattern varying means is arranged to determine the length of the reaching time substantially equal to a half value of the vibration cycle at initial control, and is arranged to determine the length of the reaching time substantially equal to the value of the vibration cycle at final control.

5. The gear shifting control device for a synchromesh transmission according to claim 3 further comprising a vibration cycle-related-amount-sensor for detecting physical quantity varying in accordance with the vibration cycle of the sleeve load, the controller further comprising a vibration-cycle-obtaining-means for obtaining the vibration cycle based on an output signal from the vibration cycle-related-amount-sensor, and the pattern varying means varies the pattern based on the vibration cycle obtained by the vibration cycle-obtaining-means.

6. The gear shifting control device for a synchromesh transmission according to claim 5 further comprising a speed related-amount-sensor for detecting a physical quantity related to speed of the sleeve and the member moved with the sleeve, the controller further comprising an initial speed obtaining means for obtaining the initial speed based on an output signal from the speed related-amount-sensor, and the pattern varying means for varying the pattern based on the initial speed obtained by the initial speed obtaining means.

7. The gear shifting control device for a synchromesh transmission according to claim 5, wherein the controller controls the actuator with an initial control started from a start of balk and a final control completed at completion of synchronization during a period from a balk start time at which the balk starts until a synchronization completion time at which the synchronization is substantially completed and the pattern varying means determines the length of reaching time from a start of supplying the driving signal to the actuator until value of the driving signal reaches a value corresponding to the required value to be substantially equal to a half value of the vibration cycle at initial control and to be substantially equal to the vibration cycle at the final control.

8. The gear shifting control device, for a synchromesh transmission according to claim 7, wherein the controller supplies the driving signal to the actuator during a period from a start of the balk until completion of the synchronization.

* * * * *